United States Patent Office 3,306,100
Patented Feb. 28, 1967

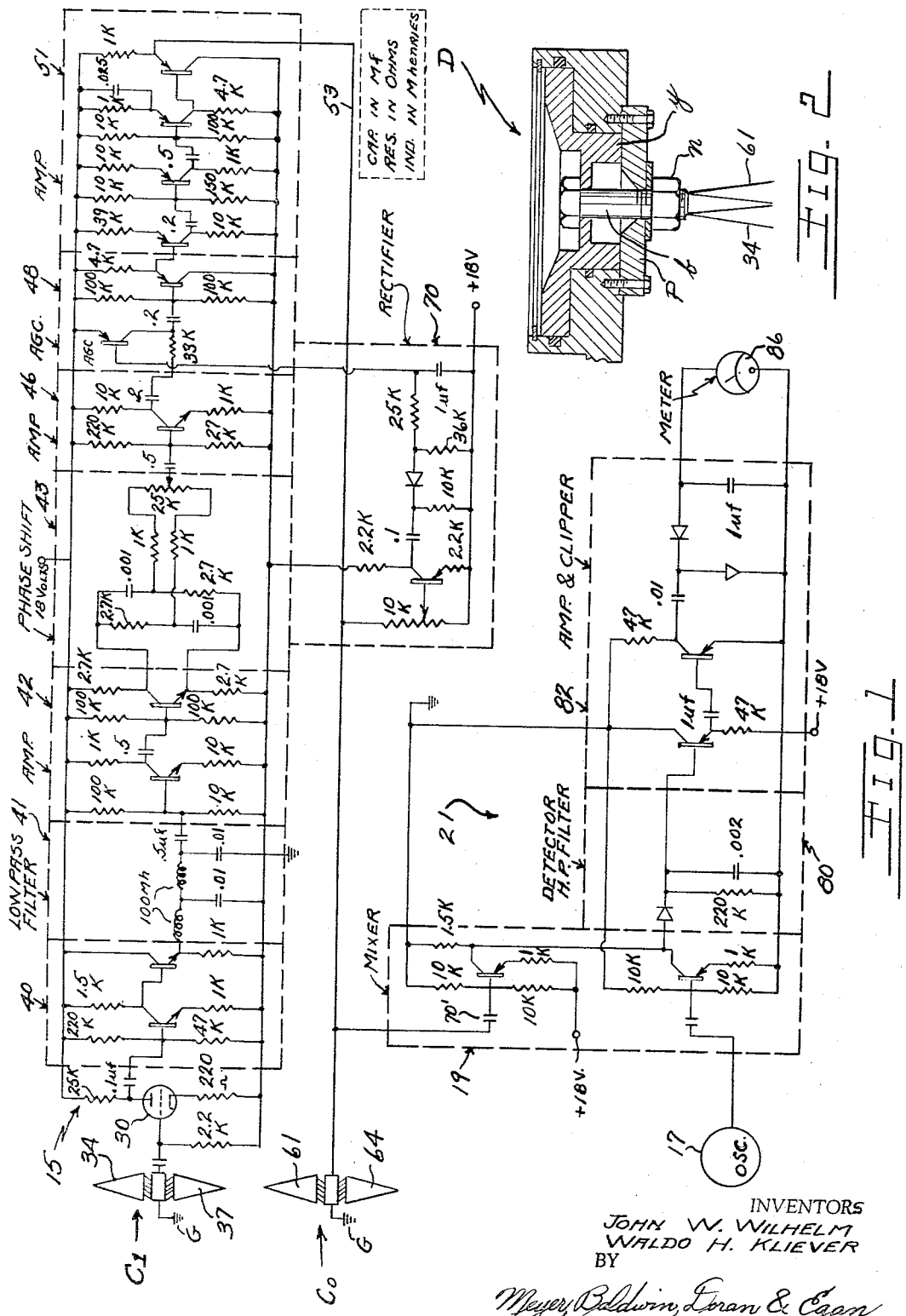

3,306,100
ULTRASONIC BOLT TENSION TESTER
John W. Wilhelm, Lyndhurst, and Waldo H. Kliever, Cleveland, Ohio, assignors to Skidmore-Wilhelm Manufacturing Co., South Euclid, Ohio, a corporation of Ohio
Filed Feb. 25, 1964, Ser. No. 347,170
4 Claims. (Cl. 73—67.2)

This invention relates to testing instrumentation especially designed to ultrasonically measure the tension developed in a fastener such as a bolt screw, or the like, as said fastener is placed into an assembly to clamp several or more elements together.

Heretofore, the usual method of determining tension in a fastener as it is placed into an assembly has been to tighten said fastener by means of a torque wrench or like tool whereby, as the torque applied to said fastener reaches a predetermined value, it is interpreted by the operator to indicate that the fastener is under certain tensile conditions.

As will be readily obvious, this method of tension measurement is highly inaccurate inasmuch as the tension that a fastener undergoes while it is being secured into its assembled position is dependent upon many factors, several of which are variable and almost impractical, if not impossible, to instantly calculate when tightening the fastener such as, for example, the frictional forces then occurring between the fastener and the elements it is clamping together.

Likewise, as is also obvious, the accuracy of interpretation by the operator of the relationship between torque and tension depends to a large extent on his experience in the field.

It is therefore a primary object of the present invention to provide a new and novel testing instrument for measuring tension (or the tensile stresses developed in a bolt or like fastener wherein the said stresses may be directly calculated) at the same time the fastener is being subjected to force creating tension conditions therein.

Another object of the present invention is to provide a tension testing instrument designed to measure tension in a bolt or like fastener as it is placed into an assembly, and which instrument is operable to measure the tension developed in said fastener as it is tightened to clamp several or more elements of said assembly together.

Additional objects and advantages of the testing instrumentation of the present invention will be realized by one skilled in the art to which it pertains, and upon reference to the following disclosure of a preferred embodiment thereof which is illustrated in the accompanying drawings wherein:

FIG. 1 is a schematic wiring diagram of the testing instrument embodying the present invention; and FIG. 2 is a sectional view of an assembly using a bolt or like fastener to hold several parts thereof together.

Briefly, the testing instrumentation of the present invention is operable to determine the elongation of a bolt or like fastener that is caused by the fastener being tightened into an assembly to clamp several or more elements of said assembly together and which elongation is directly calibrated by the instant instrumentation to measure the tension generated in said fastener.

As is well known, when an elongated article such as a rod, bolt or like element, is set to vibrate longitudinally, free vibrations are produced therein, the possible modes of vibration depending upon the manner in which it is supported. Where the article is supported at its ends or at one end, it will vibrate in its fundamental mode. In the case where the article is supported at only one end, the primary vibration in its fundamental mode produces a node at said one end and an antinode at the free end. Where the article is supported at both ends, the fundamental mode produces primary vibrations having a node at each end and an antinode at the center.

The elongated article may likewise vibrate in one or more overtones or harmonics as is well known; however, the amplitude of said secondary vibrations will be less than that of the vibrations of the fundamental mode.

The frequency of the vibrations in the article may be determined by the equation $$f = \frac{n}{2L}\sqrt{\frac{E}{d}}$$

where $n$ is the number of nodes and antinodes formed by the signal which determines the frequency mode under consideration,
$L$ is the length of the article,
$E$ is Young's modulus of elasticity,
$d$ is the density of the article.

As indicated, the frequency of vibration is inversely proportional to the length of the article, i.e., as the article becomes longer its frequency becomes lower, and vice versa.

Equally well known in the art is the law of physics referred to as Hooke's law which states that within its elastic limit the elongation of a metallic rod or like article is directly proportional to the tensile force applied thereto causing said elongation.

In the instant test instrument these physical laws are utilized to determine the tension that is developed in a bolt or like element while it is being tightened and hence incrementally elongated to clamp several or more elements of an assembly together.

More specifically, the instant test instrument is operable to determine the frequency of vibration or oscillation of a bolt or like fastener in a neutral state or condition, preferably in its fundamental mode, with no tensile force being applied thereto, and to likewise determine the change in frequency occurring as a result of the incremental elongation of the bolt which elongation is caused by tension forces being applied thereto as said bolt is placed and tightened into an assembly. This change in frequency as above mentioned is inversely proportional to the elongation of said bolt which, in turn, is directly proportional to the tension created therein, and consequently, the change in frequency can be calibrated directly in suitable tension units to indicate the tensile condition of the fastener while it is being tightened into said assembly.

With reference now directed to FIG. 2, a bolt or like fastener as identified at $b$ is shown disposed in an assembly D so as to fasten a plate member $p$ to a yoke member $y$. The plate member $p$ and yoke member $y$ are seen to be of such construction that the bolt $b$ is supported approximately at its ends therebetween, said bolt threadedly mounting a nut $n$ at its one end which may be tightened to firmly press and bind said plate member against the yoke member. As will be obvious, the more the nut is tightened against plate $p$, the more the bolt will be elongated and likewise the greater will be the tensile forces created in said bolt.

Upon initially placing the bolt into the assembly D, the nut $n$ is brought up snug against the plate to securely hold said bolt therein without causing any tension therein. Said bolt is then in its desired condition for analysis by the instant testing instrument.

The test instrument, in its present embodiment as seen in FIG. 1, comprises a signal generating circuit identified in its entirety at 15 which is operable to generate an output signal having as its primary frequency the frequency of the fundamental mode (resonance) of the bolt and which circuit includes the bolt under test which is connected into its input; a conventional oscillator 17 which generates a reference signal corresponding to the frequency of the fundamental mode of the bolt in its neutral or unstressed condition, a signal mixing circuit 19 in which the output signal of generating circuit 15 and the reference signal are mixed together to provide a differential or beat signal, and an indicator circuit 21 wherein the aforesaid differential signal is detected and applied to suitable indicating means preferably calibrated to provide a direct reading of the tension or tensile stresses occurring in said bolt.

The signal generating circuit 15 is seen to include an input stage 30 which consists of a conventional nuvistor type of tube circuit capable of sensing the presence of a minute magnitude of signal and having its grid capacitively coupled to a suitable piezoelectric crystal $C_1$, which is likewise grounded at G. The cathode of said nuvistor is also at ground potential thus connecting the crystal $C_1$ into the grid circuit therefor. A coupling cone 34 of conical configuration has its base suitably coupled to one face of the crystal $C_1$, the tip of the cone being pressed against the threaded end of the bolt $b$ as indicated at 35 in FIG. 1.

The crystal $C_1$ is preferably used since it is capable of sensing the presence of minute signals in the bolt.

An identical cone 37 is likewise similarly mounted onto the opposed crystal face to provide suitable loading therefor as will be understood.

In order to prevent parasitic signal reflections from occurring within the cones 34 and 37, it has been determined that the cone length should be approximately seven (7) times as long as its major diameter. As merely one example of cone configuration, a cone having a length of approximately two and one-half inches (2½″) and a major diameter of three-eighths inches (⅜″) has been found to be adequate.

The crystal assembly, including the crystal $C_1$ and the cones 34 and 37, is selected to have a resonant frequency that is at least twice the expected frequency of the fundamental vibration mode of the bolt.

For example, a conventional commercial bolt two inches in length has been determined by the above formula to have a fundamental frequency of approximately 70,000 cycles per second so that the crystal frequency selected to test said bolt is one having a resonant frequency of at least 140,000 cycles per second. A commercially available bolt of conventional design, one-half inch in length, has been found to have a fundamental frequency of approximately 200,000 cycles per second, bolts of various shorter and longer lengths having correspondingly different fundamental frequencies.

The remaining circuitry of the signal generating circuit 15 is preferably of solid state components and is seen to include a conventional two stage transistor amplifier 40, the output of which is applied to a filter circuit 41 which preferably has a band width in the range of 60–90 k.c.s. The output of the filter circuit 41 is seen to be connected to a second two-stage amplifier 42 which is likewise of conventional design, the output of said amplifier connecting, in turn, to a suitable phase shift circuit 43.

The signal output from phase shift circuit 43 is connected to the input of a third amplifier, as identified at 46, wherein the said signal is further amplified, the signal output from said amplifier being applied to an automatic gain control stage 48 which is intended to limit the magnitude of the signal so as to enable the generating circuit 15 to operate in its linear range.

The signal output from gain control stage 48 is additionally amplified in amplifier circuit 51 connected to the output thereof, the amplified signal output from circuit 51 being next applied through conductor 53 to a second crystal $C_0$ which preferably is identical to crystal $C_1$, said second crystal being also grounded as at G.

A cone 61, similar to cone 34, has its base suitably coupled to one face of the crystal $C_0$ so as to transmit vibrations emanating therefrom, said cone 61 also having its tip engaging the same end of the bolt engaged by cone 34, said cones being spaced apart at least one-eighth inch (⅛″) on said bolt end in order to prevent parasitic signals to be transmitted therebetween.

A second cone 64 is likewise coupled to the opposed face of the crystal $C_0$ to provide suitable loading therefor.

The crystal assembly, including crystal $C_0$, cones 61 and 64, is likewise selected to have a resonant frequency that is at least twice the expected frequency of the fundamental vibration mode of the bolt $b$.

The instrument circuitry also includes rectifier circuit 70 which provides the necessary operating potentials to the several stages of the signal generating circuit 15 as indicated in FIG. 1.

With the signal generating circuit 15, as thus far described, coupled to the crystal $C_1$ hereinafter defined as the sensing crystal and its output to the crystal $C_0$ hereinafter defined as the driving crystal, and with the crystals coupled to the bolt $b$, this resultant assembly defines a closed loop signal generating circuit.

With the potentials applied to said loop circuit as indicated, it will oscillate and select as its frequency of oscillation the frequency (70,000 c.p.s. for a 2″ bolt) at which the bolt builds up its strongest oscillations in the following manner.

Upon initially energizing the generating circuit 15, the bolt $b$ is activated by the driving crystal $C_0$ so as to begin to vibrate and, since it is supported at its ends as aforementioned, it tends to vibrate in its fundamental frequency mode of approximately 70,000 cycles per second.

This vibration is sensed by the crystal $C_1$ and applied to the input 30 of the circuit 15. The sensing crystal $C_1$ also tends to vibrate at its resonant frequency (140,000 c.p.s.) so that the input signal to generator circuit 15 will likewise include this frequency component among others.

This composite signal is then amplified in amplifier stage 40 and applied to the filter 41 which is set to have a band pass frequency of 60–90 k.c.s. for testing a two-inch bolt whereby the signals of higher and lower frequencies outside of this band are eliminated. As a result, the output signal from filter 41 contains frequencies between approximately 60–90 k.c.s., the largest component thereof being attributed to the fundamental frequency (70,000 c.p.s.) of the bolt $b$.

The signal from filter 41 is then amplified in amplifier 42 and applied to the phase shift circuit 43 wherein the phase of the signal may be adjusted to compensate for any shift in signal occurring in the generating circuit 15.

As aforementioned, this signal is further amplified by amplifier stages 46 and 51, being limited to a magnitude by the AGC circuit 48 to an output below that at which the signal becomes nonlinear.

The output signal of circuit 15 is then applied and fed back by driving crystal $C_0$ and cone 61 to the bolt $b$ to thus complete the closed loop circuit which is effective to sustain the vibration of said bolt and circuit 15 at the fundamental mode of approximately 70,000 cycles per second.

The output signal from generator circuit 15 which represents the fundamental frequency mode of the bolt in its unstressed condition is also coupled through conductor 53 and capacitor 70′ to the input of a signal mixer or heterodyne circuit of conventional design as identified at 19.

The aforementioned oscillator 17 is likewise coupled to the mixer circuit wherein the two signals are mixed or beat together.

The frequency of oscillator 17 is adjusted so that it matches that of the signal output from generator circuit 15 whereby, upon being heterodyned in mixer stage 19 with said signal output, each effectively cancels the other so that a zero beat signal is realized as the output of the mixer stage.

The output of the mixer stage 19 is seen to be connected to the input of a detector and high frequency filter circuit 80 of the indicator circuit 21 which has its output connected to the input of an amplifier-clipper 82, said amplifier-clipper having its output, in turn, connected to a suitable meter 86 which may be calibrated in any desired scale to read tension units directly which are occurring in the bolt under test.

The filter circuit 80 is operable to pass the beat signal output from mixer stage 19 and to cancel out the signals from generator circuit 15 and oscillator 17.

The oscillator output is adjusted so that, with the bolt $b$ in its unstressed condition, the meter 86 provides a zero indication and the test instrument is then ready to measure the tension in said bolt $b$.

The operator turns the nut $n$ in the direction to tighten the bolt $b$ in its assembled position, the application of said tensile force resulting in incrementally elongating said bolt.

As a result, the bolt will tend to vibrate at a new lower fundamental mode or frequency corresponding to its longer length. Consequently, the frequency of the signal output of circuit 15 also changes to this new fundamental frequency.

Said output signal, when applied to and mixed with the oscillator signal, provides a beat signal that corresponds in its frequency difference to the magnitude of the tensile conditions occurring in the bolt $b$.

The amplifier-clipper 82 is preferably of the saturated type so that only the portion of the beat signal of greatest magnitude is passed therethrough to the meter 86 thus clipping the portions of the signal of lower magnitude which represent harmonics and/or overtones of the fundamental frequency of the output signal.

As a result only the portion of the beat signal representing the fundamental frequency mode of the bolt is applied to the meter 86 whereby, as aforementioned, with the scale calibrated in suitable tension units, the tension generated in said bolt may be immediately indicated.

In this manner, the nut $n$ may be tightened until the tension indicated on meter 86 is the optimum design value determined for the bolt $b$ under test so that its maximum strength is utilized to clamp the elements of assembly D together.

Although not herein disclosed, the test instrument may be enclosed within a conventional torque wrench or a portable type of casing such as, for example, the type normally used for a pistol type of electric soldering iron so that the cones 34 and 61 may be manually held against the bolt b while it is tightened and then easily removed and applied to the next bolt to be tightened.

What is claimed is:

1. A test instrument for determining tension in a bolt or like element comprising, circuit means including mechanical-electrical transducer means operatively connected with one end of said bolt for causing resonant vibrations of the bolt and for generating a first electrical signal having frequency characteristics corresponding to said resonant vibrations and representative of the length of the bolt in a nonstressed condition, said circuit means being operable upon the elongation of said bolt to provide a second electrical signal having frequency characteristics corresponding to resonant vibrations of said bolt at its new length, means for providing an electrical reference signal which has identical frequency characteristics to the first electrical signal, said circuit means including filter means operable to cancel signal components from said first electrical signal which have frequency characteristics that are dissimilar to the frequency characteristics of said bolt, and means for mixing said second electrical signal and said reference signal whereby to provide a resultant signal corresponding to the elongation of said bolt.

2. A test instrument as is defined in claim 1 and which includes means for indicating the resultant signal and which is calibrated in tension units.

3. A test instrument for determining tensile conditions in a bolt or like element comprising, circuit means including a vibration transducer operatively connected with one end of said bolt for generating a first electrical signal having frequency characteristics corresponding to resonant frequency vibrations representative of the length of the bolt in a nonstressed condition, said circuit means being operable upon the elongation of said bolt to provide a second electrical signal having frequency characteristics corresponding to resonant frequency vibrations representative of its new length, output means in said circuit means, feedback means including a second vibration transducer connecting with said end of said bolt and said output means effective to feed the electrical signals back to said bolt whereby to sustain the operation of said circuit means at said representative resonant frequency of said bolt, oscillator means for providing an electrical reference signal which has identical frequency characteristics to said first electrical signal, said circuit means including filter means operable to cancel signal components from said first electrical signal which have frequency characteristics that are dissimilar to the frequency characteristics of said bolt, heterodyning means for mixing said second electrical signal and said reference signal to provide a resultant beat signal, and means connected to said heterodyning means for sensing and indicating said beat signal and calibrating said beat signal into tensile stress units.

4. A test instrument as is defined in claim 3 and wherein the sensing means includes filter means operable to separate the beat signal from said second signal and said reference signal.

References Cited by the Examiner

UNITED STATES PATENTS

| | | | |
|---|---|---|---|
| 2,137,852 | 10/1938 | Nicolson | 73—67.2 X |
| 2,968,943 | 1/1961 | Statham | 73—398 X |
| 3,186,226 | 6/1965 | Milnes et al. | 73—67.2 X |

FOREIGN PATENTS

| | | |
|---|---|---|
| 211,756 | 10/1960 | Australia. |
| 464,516 | 8/1928 | Germany. |

OTHER REFERENCES

"Les applications du Quartz dans L'Industrie," periodical Mesures, Technique and Appareils, March 1947, pp. 73–77.

RICHARD C. QUEISSER, *Primary Examiner.*

J. P. BEAUCHAMP, *Assistant Examiner.*